Patented Sept. 13, 1932

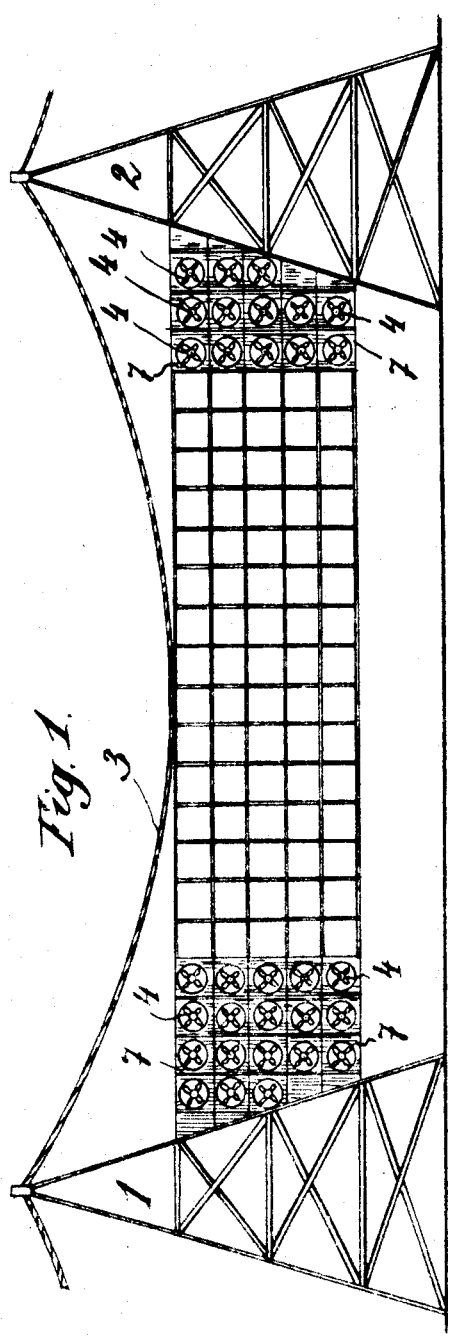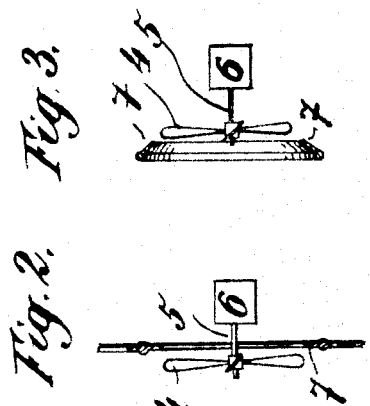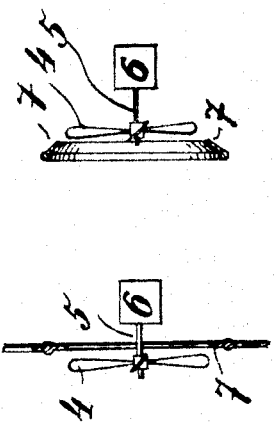

1,876,595

UNITED STATES PATENT OFFICE

ALEXANDER BELDIMANO, OF ROTTERDAM, NETHERLANDS

GENERATING ELECTRIC POWER BY MEANS OF WIND

Application filed June 18, 1929, Serial No. 371,949, and in Germany June 27, 1928.

This invention relates to an appliance intended to generate electric power by means of wind. Several proposals have already been made to utilize the power of the wind for the generation of electric power. The usual application of a wind wheel suffers from the drawback of very low economy, as the power gained is in a very unfavorable proportion to the manufacturing costs of the installation. Now, in order to derive from the wind as much power as possible, the diameter of the wind wheel could be increased which increase, however, requires a tower of correspondingly greater resistibility. Furthermore, the limit of the possibility to increase the diameter of the wheel is reached very soon. By this reason the application of one great wind wheel has been abandoned in designing wind power stations, and installations have been proposed in which a great number of small wind wheels are arranged in a rotatable framework of correspondingly large dimensions or in channels of a solid wall, the power of these small wheels being transmitted by gearings to one or more common electric generators.

Now it is well known that any power when transmitted by a pair of toothed wheels is reduced by a certain percentage. When for instance 500 small wind wheels are provided in installations of this type, at least 500 pairs of bevel wheels must be arranged to transmit the power. Furthermore, besides the power consumption by these gear wheels, the losses due to friction arising in the several bearings have to be borne in mind, each wheel shaft requiring two bearings and each transmitting shaft two or more bearings. When the lubrication of one of the numerous bearings is neglected, the effect of the entire installation is jeopardized for a shorter or longer period of time. Consequently, besides its high manufacturing costs, an installation of this type requires a comparatively costly and careful attendance.

Now the object of the present invention is a wind power installation which does not suffer from these drawbacks which object is obtained by the fact that within superimposed and juxtaposed apertures of a stationary or adjustable wall of any suitable material or in the meshes of a net of suitable large dimensions suspended from piles, masts or supporting towers, each a wind wheel is mounted the dimensions of which correspond to those of said apertures or meshes and the shaft of which carries the rotor of a small generator. The electric current generated is fed to a collecting station where by suitable switching means the individual generators can be connected, as desired, in parallel, in series or in mixed connection.

As these small wind wheels together with the generator form a unit and the wheel and the rotor are mounted on a common shaft, only one sole bearing is required for this unit the shaft of which when a suitable lubricating device is provided can run a year and more without any attendance. It is merely the commutator which is subjected in this case to a certain wear and which by this reason advantageously is made exchangeable.

As calculations have proved, the efficiency of a wind power installation comprising 10000 of these small wind-driven generators is so high that the costs of the installation are redeemed within very short time.

In order that the invention can be more readily understood, an embodiment thereof is diagrammatically illustrated by way of example in the accompanying drawing in which Figure 1 is a view of the installation, while Figures 2 and 3 show details thereof.

As to be seen from Figure 1, a net consisting of wire ropes or hingedly interconnected iron rods is suspended between two towers 1 and 2 the meshes of which net are quadrangular, each side having a length of 1 $m$ for instance. The net is suspended from one or more strong wire ropes 3 like electric overhead wires. In each of the squares is suspended a small wind wheel which has two or more blades 4 and the shaft 5 of which drives a small electric generator 6, as illustrated in Figure 2. The diameter of the wind wheel is about equal to the length of the sides of each square. The electric current generated is supplied to the collecting or consumption station by suitable conduits (not shown).

In order to better utilize the wind power, the space existing between the circles described by the wind wheels may be obturated by solid wall pieces 7 of sheet metal or the like, as shown in Figure 1, so that no wind can pass uselessly through the net between the individual wheels. As illustrated in Figure 3 these sheet metal pieces may be designed so as to form funnels.

Furthermore, the net itself may be composed of hingedly interconnected plates 7, each vertical row of plates being in connection with the supporting rope 3 by a suspension member in a manner known from the suspension of the gang way of suspension bridges.

It is, of course, to be understood that nets as described can be erected in any desired dimensions on places that are exposed to the wind in a particularly high degree. With such an arrangement only those winds will have no effect that strike the net in its longitudinal direction. Winds of any other direction are utilized for the generation of electric power. The net will blow out like a sail and offer a resistance even to winds which strike it at an angle less than 90 degrees so that the wind is forced to pass through the apertures and to actuate the wind wheels.

Without deviating from the scope of the invention a wall or a trestle having a wooden or sheet metal wall may be provided in place of the described suspended net. In this case the trestle can be mounted in known manner so as to be adjusted according to the direction of the wind.

I claim:

An installation for deriving power from the wind, comprising a vertically disposed flexible net, the meshes of said net constituting a plurality of juxtaposed apertures extending through said net, and wind wheels arranged in said apertures.

The foregoing specification signed at Rotterdam, Netherlands, this fifth day of June, 1929.

ALEXANDER BELDIMANO.